United States Patent Office 2,848,922
Patented Aug. 26, 1958

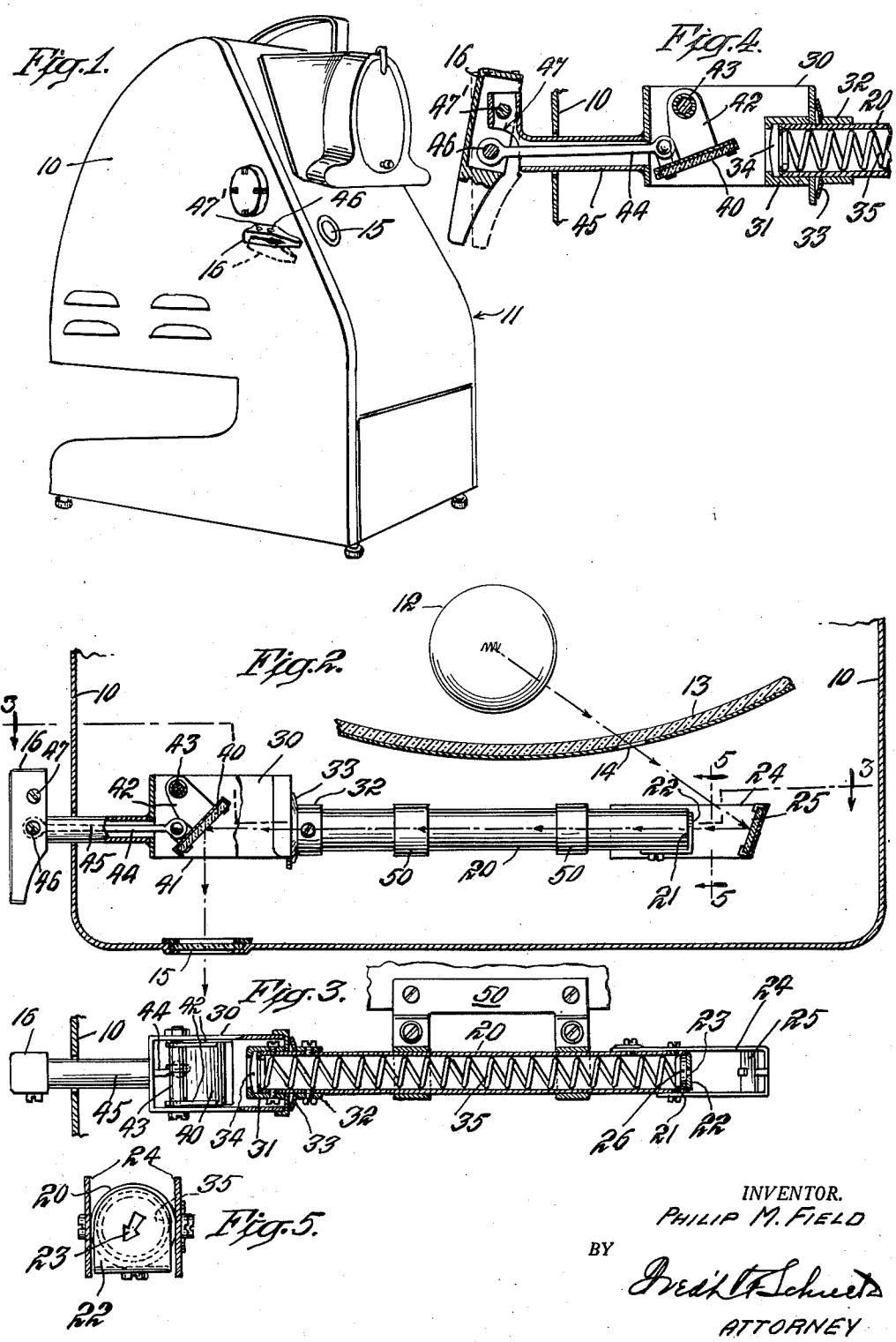

2,848,922

OPTICAL INDICATOR MEANS FOR USE WITH COPY PROJECTION APPARATUS

Philip M. Field, Maplewood, N. J., assignor to Charles Beseler Company, East Orange, N. J., a partnership Application February 15, 1956, Serial No. 565,594

3 Claims. (Cl. 88—24)

The invention relates to projector apparatus designed for the projection upon a suitable screen of opaque copy, such as photographs, post cards, pages of a book or magazine, as well as three-dimensional objects; and, more especially in connection with the projected image of the copy upon the screen, of an image pointer also on said screen, the latter image being readily controllable manually for location or superimposition on the projected copy at any part of the same as may be desired.

In a prior U. S. Patent No. 2,555,402 granted to me the 5th day of June 1951, there is disclosed such pointer image-producing means but in which all of the components thereof to be associated with the source of illumination of the projector apparatus, or with an independent source, are not attachable as a single unitary structure to said projector apparatus. Thus, the condenser lens with its aperture-forming means is associated and attached to such apparatus independently of the mechanism directly controlling the movements of the pointer image.

It is an object of the instant invention to assemble the various components of the indicator projection means into a unitary structure which may be distributed independently of the projector apparatus for ready installation therein, as well as being better suited for initial build-in when the projector apparatus is assembled in manufacture, the unit in this respect being also more readily alignable with its source of illumination.

A further object of the invention is to provide a unit of the aforesaid nature wherein details anywhere on the screen may readily be pointed out by spotting the same with the projected pointer image, upon corresponding manipulation of an associated operating handle or knob. Such handle is to be located externally of the projector apparatus, conveniently for manual actuation by the operator of said projector apparatus and in the same direction it is desired to have the pointer image go.

Another object of the invention is to effect the control in a manner such as to avoid an open slot construction in the housing, as in the prior embodiment.

Still another object of the invention is so to construct the indicator unit that it may utilize the projector apparatus source of illumination for projection of the pointer image, said indicator unit to this end being located as to be directly aligned therewith.

In carrying out the invention, the pointer image producing and projecting elements are embodied in a unitary structure which may readily be installed within the housing of opaque copy projector apparatus, the light source for illumination of copy in the apparatus serving as the source for the unit, as by removal of a small portion of the coating of its reflector mirror. The unit at its inner end is to be optically aligned with said removed portion; and at its opposite end is provided with a novel manually actuable means for directing the pointer image, which follows correspondingly operation of a handle element outside the projector apparatus housing. The latter is brought externally of the housing in a manner to avoid a large opening thereto, as an open slot, and thus prevents substantially entrance of dust and other foreign matter into the housing of the opaque projector apparatus, as well as into the novel unit, and also prevents the emergence of disturbing light from the interior of the housing.

The nature of the invention, however, will best be understood when described in connection with the accompanying drawings, in which:

Fig. 1 is a view in isometric projection of an opaque projector apparatus, showing the manual operating handle for control of the projected pointer image.

Fig. 2 is an enlarged, fragmentary horizontal section through the projector apparatus and illustrates the general location of the pointer image projecting unit within the housing of the opaque projector apparatus, more especially with respect to its source of illumination.

Fig. 3 is a vertical section, taken on the line 3—3, Fig. 2—the controlled indicator-image projecting mirror being shown in one of its extreme positions as controlled by the manual operating handle means.

Fig. 4 is a fragmentary longitudinal section through the manual operating handle and associated controlled indicator-image projecting mirror.

Fig. 5 is a transverse vertical section taken on the line 5—5, Fig. 3, and looking in the direction of the arrows.

Referring to the drawings, 10 designates the housing of an opaque projector apparatus 11, comprising for illumination of copy the conventional type of electric lamp, as is indicated at 12, Fig. 2. Such lamp is generally associated with a copy-illuminating reflecting mirror, as the glass-silvered mirror 13 which, in accordance with the present invention, serves also as the light source for the projection of the pointer image, and to this end a small area of its silver coating is removed as is indicated at 14. The said pointer image is to be projected through an opening or window 15 of the housing and is controlled by manually actuable means such as the handle member 16 mounted at one side of said housing exteriorly thereof.

In accordance with the invention, the pointer-image projecting components are so assembled that the projected image will follow directionally the movements of said handle member. That is to say, moving it up or down raises or lowers correspondingly the position on the screen of the pointer image as superimposed upon copy projected thereon, and moving it right or left moves the pointer image correspondingly from side to side. Thus, any portion of the screen may be covered by the pointer image and without undue concentration on the manipulation of the handle means by the projector apparatus operator.

To this end, and to afford also a unitary structure, the various components of the novel assembly are to be mounted within the housing 10 in a position such that light from lamp 12 passing through the opening 14 of its reflecting mirrow may be picked up by the unit. The latter is conveniently assembled around a tubular element 20 having its one end 21 closed by an aperture plate 22, the cut-out opening 23 simulating an arrow, for example, as a pointer or indicator design to be projected upon a screen with copy from the projector apparatus 11. This may conveniently be effected by mounting over said end 21 an angle piece as the apertured plate 22, one arm of which is screwed to the wall of the tubular element and the other and aperture-bearing arm otherwise completley obscuring the opening at said end 21.

In order to direct light rays from lamp 12 through the cut-out opening 23, a mirror-bearing U-shape bracket 24 is secured over the end 21 of the tubular element, the mirror 25 being optically aligned with the said cut-out opening and the opening 14 to direct light through the former opening as well as through a condensing lens 26 located beyond cut-out opening 23 to project the image of the aperture design toward the opposite end of tube 20.

This end of the tubular element has oscillatably mounted thereover a frame 30, the same being frictionally secured thereto between an end sleeve element 31 and a collar 32 attached to the tubular element, with a spring washer 33 inserted between collar 32 and the frame over said tubular element and bearing against the housing.

Within the sleeve element 31 is mounted an objective lens 34, and this lens as well as the condensing lens 26 is conveniently held in position through the action of a coiled spring 35 axially mounted within the tubular element. By the foregoing arrangement, an image of the aperture design will therefore be projected by the lens 34 along the optical axis of the said lenses when the lamp 12 is energized.

Such image is designed to be directed to a mirror 40 carried by the frame 30 which is manually rockable to reflect the image laterally outwardly through the open side 41 of the frame and thence through the aligned opening 15 in the housing toward a screen upon which matter projected by the projector apparatus is being displayed.

The positioning of this projected pointer or indicator image on the screen is controlled from the handle member 16 which is of novel construction. Reference being had particularly to Figs. 2 and 4, the said handle member is so connected with the frame 30 as to rock the same with mirror 40 on tubular element 20 and about the optical axis of lenses 26 and 34, thereby swinging the projected image in the corresponding direction vertically on the screen.

However, to secure a lateral displacement of the image, the mirror 40 itself must be rocked and to this end it is pivotally mounted in the framing, being pivoted through an arm 42 to the frame at 43. To thus rock the mirror, a connecting rod 44 is provided to attach it to the handle 16; and the same extends, in the optical axis of the lenses, through a tubular angular support member 45 for handle 16, said support member being fixed to the frame and the connecting rod pivotally attached to the handle at 46.

As shown, the tubular support is opened at its bend to provide the opening 47 for said connecting rod; and the handle is fulcrumed at 47 to said support. By this arrangement, not only may the handle 16 be manipulated to rock the frame 30 and thereby mirror 40 about the optical axis of the lenses for vertical adjustment of the image; but, by pushing in the handle or pulling it outwardly, the mirror as a whole is displaced relatively to its frame 30 to secure the adjustment across the screen.

To mount conveniently the novel image-producing and projecting unit within the housing of the projector apparatus, an attaching bracket member 50 is clamped over the tubular element 20.

I claim:

1. A pointer-image projector unit, comprising a single, fixed and open-ended tubular housing adapted for mounting on projector apparatus provided with a source of illumination; a plate closing one end of the housing and having an aperture adapted to pass a beam of light through the housing from the source of illumination which conforms to an indicator image to be projected on a screen simultaneously with copy projected by the projector apparatus; a condenser lens within the tubular housing associated optically with the apertured plate; an objective lens mounted at the other end of the tubular housing in the optional axis of the condenser lens; a frame frictionally supported over and for oscillation on said other end of the tubular housing and coaxially therewith, and having a projection opening; a mirror rockably mounted and positioned angularly in the frame in the path of the projected aperture image, the latter being directed thereby toward said projection opening; and manually actuatable means to rock the frame, including a support member extending therefrom coaxially with respect to the tubular housing, and a handle element pivotally attached at its one end to an angular extension of the support member, together with a link connecting the handle element with the mirror to rock the latter.

2. A unit according to claim 1, wherein the support member is tubular and the link passs therethrough.

3. A unit according to claim 2, wherein the angular extension is at right angles to the support member and to which the handle element is pivoted, the link being pivoted at its outer end to said handle element and at its inner end to the mirror, both substantially in the longitudinal axis of the tubular housing.

References Cited in the file of this patent

UNITED STATES PATENTS

| | | |
|---|---|---|
| 2,357,542 | Pfeil | Sept. 5, 1944 |
| 2,555,402 | Field | June 5, 1951 |
| 2,663,220 | Taylor | Dec. 22, 1953 |